United States Patent [19]
Nomura

[11] 3,916,739
[45] Nov. 4, 1975

[54] TOOL HOLDER
[76] Inventor: Takayuki Nomura, Tanazawa 437, Okutamamachi, Nishitamagun, Tokyo, Japan
[22] Filed: July 19, 1973
[21] Appl. No.: 380,691

[52] U.S. Cl. .......................................... 82/36; 29/98
[51] Int. Cl.² ...................... B23B 29/00; B26D 1/00
[58] Field of Search ................ 82/35, 36, 37, 36 A; 29/98, 96

[56] References Cited
UNITED STATES PATENTS

| | | | |
|---|---|---|---|
| 767,317 | 8/1904 | Strand | 82/36 R |
| 1,268,969 | 6/1918 | Harding | 82/36 R |
| 2,151,379 | 3/1939 | Flaker | 82/35 |
| 2,451,684 | 10/1948 | Megel et al. | 82/36 R |
| 2,458,244 | 1/1949 | Bohl | 29/98 |
| 2,482,041 | 9/1949 | Tiefenbacher | 82/36 R |
| 2,665,605 | 1/1954 | Pierce | 82/36 R |
| 3,121,939 | 2/1964 | Williams | 29/96 |
| 3,497,935 | 3/1970 | Bowling | 29/96 |
| 3,628,404 | 12/1971 | Riley | 82/36 A |

*Primary Examiner*—Harrison L. Hinson
*Attorney, Agent, or Firm*—Fidelman, Wolffe & Leitner

[57] ABSTRACT

A tool holder, designed to be easily mounted, centered and accurately positioned on a moving head stock type screw machine, including two parallel attaching pins fastened to a tool rest and aligned with two holes on the body of the holder. One attaching pin is held in its hole by a locking pin adjusted by an eccentric camshaft. The other attaching pin is held in place by two adjustable bolts.

5 Claims, 9 Drawing Figures

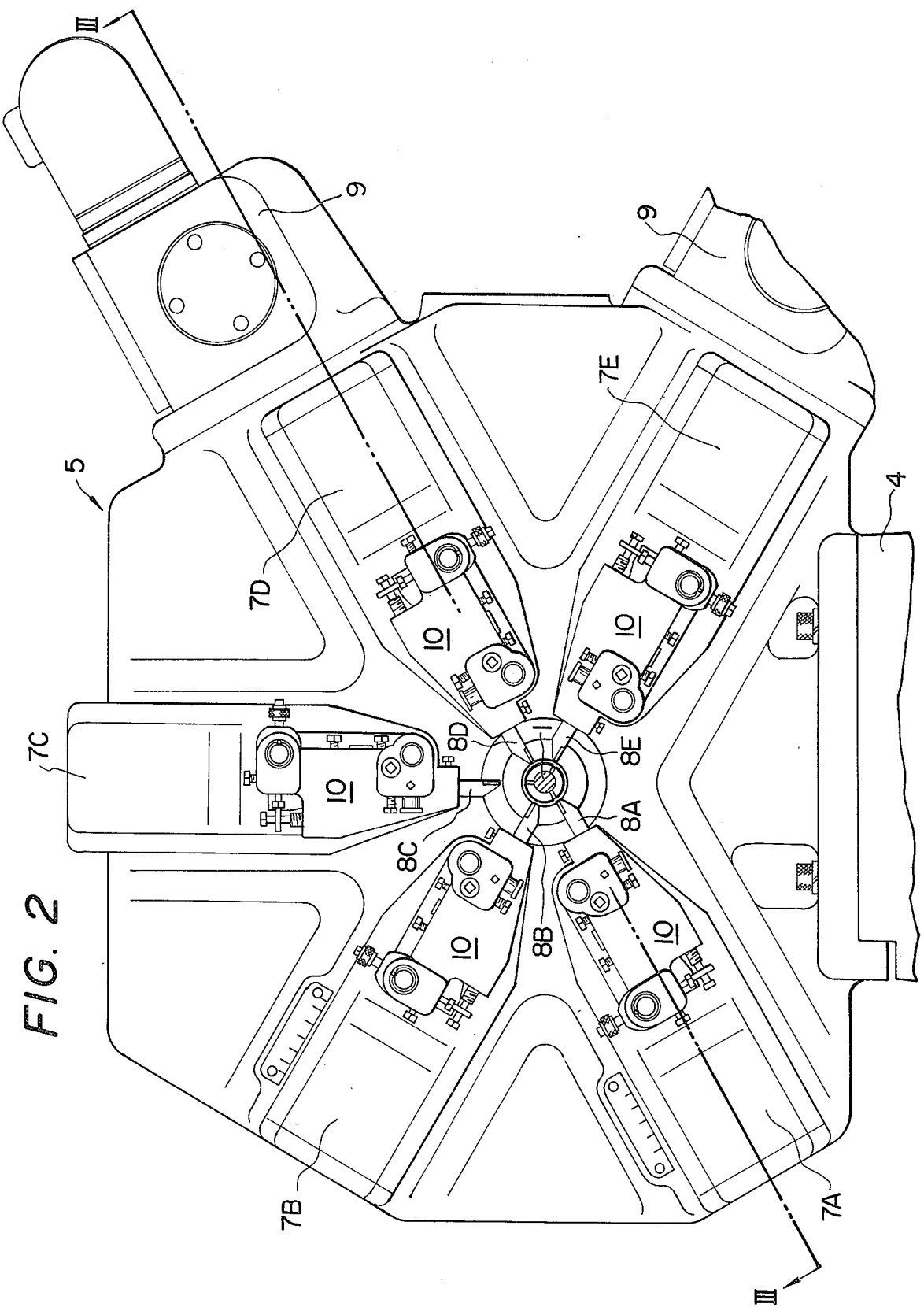

TOOL HOLDER

This invention relates to tool holders and particularly to an improved tool holder which can easily be mounted and centered on a moving head stock type screw machine.

In machine tools, it has been considered significant for a cutting tool to be accurately positioned. Particularly, with the recent advance of highly automated machine tools or with the advance of unmanned management of a factory by employment of a group management system through a computer, importance is placed on the accuracy of the control system as well as the accurate attaching of cutting tools to provide highly accurate adjustment of a zero point. The reason is that if the cutting tool is not properly positioned, an error is introduced which cannot be corrected or compensated for by even highly accurate machine tools or control units.

In the field of machine tools requiring high accuracy, several prior art methods or devices for accurately centering the cutting tool, which centering is considered as a basic matter of accuracy, have been known.

For example, there is a simple centering method of the type in which centering is carried out, on the basis of the experience of the operator, by guess-work utilizing a plate. This is a most conventional method now in use.

In numerical controlled machines, it is most important to make a zero point adjustment by means of accurate centering. Thus, a method is coming into wide use in which an exclusive microscope type centering jig is used to provide highly accurate centering.

The method for centering the cutting tool by use of a centering jig now partially meets the demands of numerically controlled machine tools requiring high accuracy. However, the centering jig is not attached to the machine tool body but is in the form of an independent device. It is therefore difficult to accurately trace the position of the cutting tool specially and accurately centered on the jig and to attach it to the machine tool. In many cases, accuracy is reduced during the time of tracing, extremely complicated attaching mechanisms and operations are required and rigidity with respect to the cutting resistance is lost.

The invention overcomes the limitations noted above with respect to prior art devices by providing an improved tool holder which is of a pin lock type and can be simply and accurately set.

It is an object of this invention to provide a method for setting cutting tools which can perform centering and tracing accurately in a simple operation using the aforementioned tool holder.

It is a further object of this invention to provide an attaching construction for cutting tools which is simple, easy to manufacture and which has a high rigidity relative to cutting resistance.

In order to accomplish the objects noted above, the invention provides a construction such that two attaching pins of large diameter are projected in parallel on the cutting tool rests. Pin holes allowing a fit tolerance on the order of several microns are made in the tool holder in positions corresponding to the attaching pins mounted on the cutting tool rests so that the tool holder may be mounted on the cutting tool rests by action of a pin lock mechanism. Similarly, also in a microscope type centering jig, two pins of the same shape are projected on the jig in the same arrangement as the attaching pins for the cutting tool rests, so as to be able to carry out the centering operation from the jig to the machine tool body.

Further objects and effects of the invention will be understood from the hereinafter detailed description with reference to the accompanying drawings and preferred embodiments in which:

FIG. 2 is a front elevation of a guide bushing embodied in the screw machine of FIG. 1;

Figure 1:
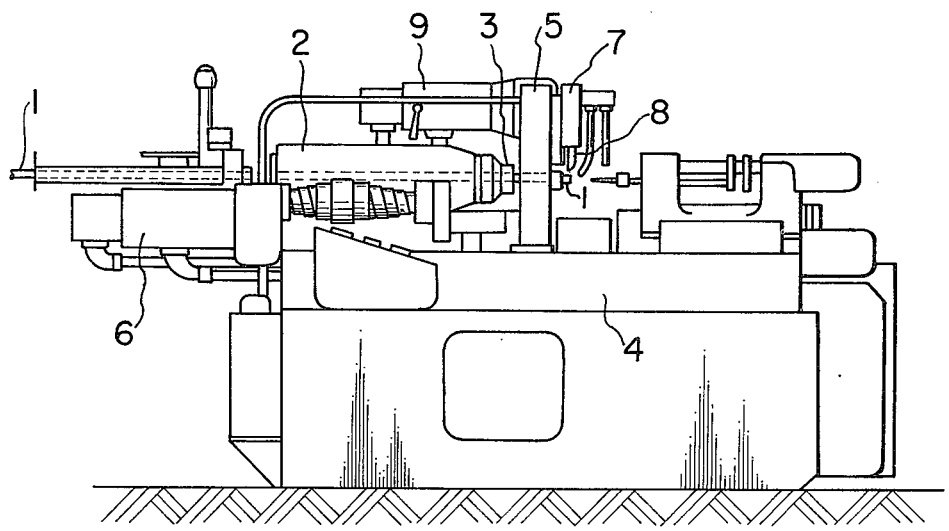
FIG. 1 is a front elevation of head stock moving type screw machine.
Figure 4:
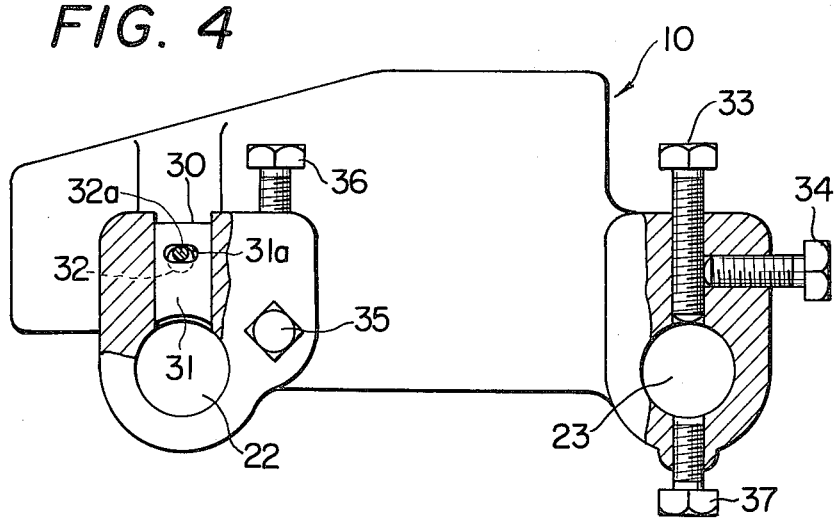
FIGS. 4 to 7 are a plan view, front view, left side view (partly broken away), and a rear elevational view, respectively, of a tool holder.
Figure 5:
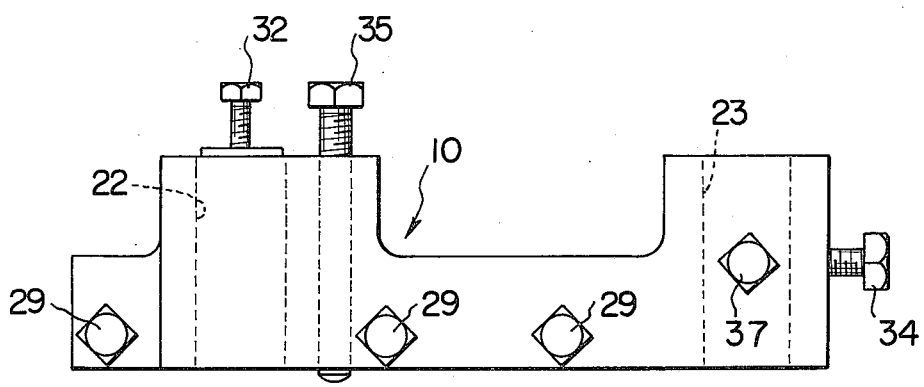

FIG. 1 is a front elevation showing a complete screw machine with a numerical control. A lengthy bar-like work 1 of several meters is passed through from the rear of a head stock 2 and is firmly clamped by a chuck 3 and the foremost end of the work 3 is also passed through a guide bushing 5 rigidly mounted on a bed 4. The head stock 2 is linearly fed by a drive mechanism system including a numerically controlled servo-motor 6. At the same time, cutting tool rests 7, which are radially mounted with respect to the centrally positioned work 1 on the guide bushing 5 and have cutting tools 8 attached thereto, are also fed in sequence by a drive mechanism system including a numerically controlled servo-motor 9 to thereby provide a consistent cutting operation of work 1 with high efficiency.

The guide bushing assembly 5 comprises the subject matter of application Ser. No. 209,153, filed Dec. 17, 1971. However, the operation and construction of this assembly is herein summarized with reference to FIGS. 2 and 3.

The front portion of the guide bushing 5 is clearly illustrated in FIG. 2. FIG. 2 shows cutting tool rests 7 radially disposed with respect to the centrally positioned work 1, with two sets of cutting tool rests 7 opposedly arranged. There are five rests in all; that is, cutting tool rests 7A to 7E, which are driven by two servo-motors 9 and 9. Cutting tools 8A to 8E of the type as required are accurately centered and mounted by utilizing tool holders 10 attached to the cutting tool rests 7.

Figure 3:
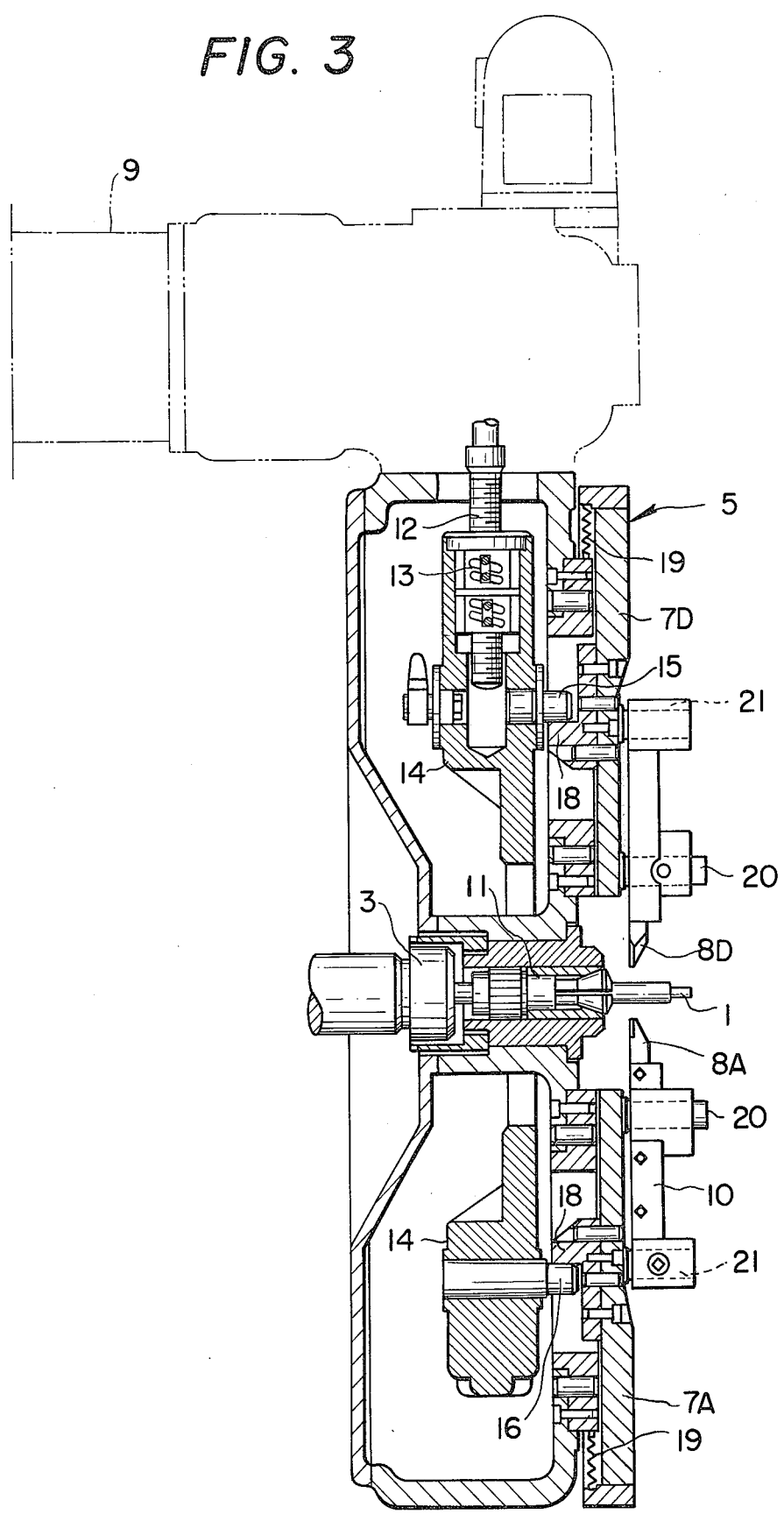
FIG. 3 is a sectional view taken on line III—III of FIG. 2.
Figure 6:
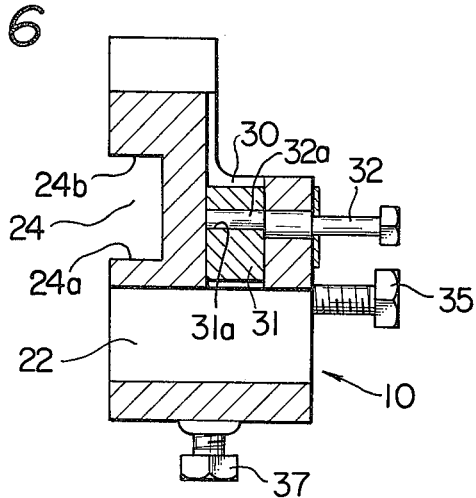

The relative construction between the guide bushing frame and the cutting tool rests will briefly be described with reference to FIG. 3.

The work 1 is held passing through the central portion of the guide bushing frame 5 and a guide bushing 11 is mounted so as not to produce a rotating vibration affected on the work when in cutting.

The details of the driving mechanism are described in the aforementioned Ser. No. 209,153, and are not described here. It has such construction that the output from the servo-motor 9 is transmitted to a feed screw shaft 12 and a lead nut 13 in a ball screw relation therewith and is secured to a slider 14 which is slidable with high accuracy in an axial direction. Pin 15 or 16 of a large diameter projected from the slider 14 is placed in contact with the back of L-shaped block 18 secured to the bottom of cutting tool rests 7A and 7B opposedly arranged in a paired relation, and two cutting tools rests 7A, 7D or 7B, 7E are fed by utilization of both normal and reverse revolutions of the servomotor 9.

Compression coil springs 19 effect backing operation of the cutting tool rests.

Construction of a tool holder 10 specifically designed in accordance with this invention will now be described with reference to FIGS. 4 to 7.

As previously described, this tool holder 10 is attached by use of two attaching pins 20 and 21 positioned in parallel on the cutting tool rest 7 to align with pin holes 22 and 23 on the tool holder 10 and into which the attaching pins 20 and 21 are fitted. Moreover, both attaching pins 20,21 and pin holes 22,23 are accurately machined to allow a fit tolerance less than 0.01mm.

In order to properly mount a cutting tool 8, a channel 24 for receiving the cutting tool is provided in the rear of the tool holder 10 in a direction parallel to a line connecting the two pin holes 22 and 23. Further, a wall surface 24a close to the center of the channel 24 is placed in parallel to the line connecting two pin holes 22 and 23, while the other wall surface 24b has an inclined surface having an angle which becomes narrow in the width of channel toward the forward portion.

In order to set the cutting tool 8, a doubling plate 25 is interposed against the wall surface 24a close to the center of the channel 24 to insert the cutting tool 8 into the channel. A wedge 26 having the same slope as the inclined wall surface 24b is placed on the side of the wall surface 24b. A connector 28 in association with the wedge 26 is mounted on an adjusting bolt 27 for fine adjustment and arranged to be threaded in the direction of the forward portion of the channel, whereby the cutting tool 8 can be set in its optimum position.

Further, in order to set the cutting tool 8 in its optimum position, three adjusting bolts 29 threaded from the side of the tool holder 10 play an important role. Furthermore, the aforesaid connector 28 may be in the form of a washer, constructed of a material which can accurately transmit pressure to the wedge 26 without deforming the amount of threading of the bolt 27.

As previously mentioned, the attaching pins 20,21 and pin holes 22,23 of the tool holder 10 are in relation of allowing a high fit tolerance less than 0.01mm to such extent that fitting can be performed only when sufficient adjustment is manually made. However, a complete dependence on such fit tolerance results in a looseness that makes it impossible to obtain cutting of high accuracy. According to the invention, the aforesaid problem is solved as discussed below.

With respect to the forward pin hole 22, if mounting with reasonable accuracy (that is, positioning without having looseness) can be made, fine adjustment may be made at the rear pin hole 23. A step reverse to the above may not be impossible, of course, but it is disadvantageous in view of the dynamics involved.

To lock the attaching pin 20 to be fitted into the forward pin hole 22, a hole 30 is drilled into the middle of the pin hole 22 in a direction perpendicular to the axis of pin hole 22, and a lock pin 31 is slidably fitted into the hole 30 with a fit tolerance less than 0.02mm. Further, an eccentric cam shaft 32 is rotatably mounted from the upper direction perpendicular to the lock pin 31, and an eccentric cam 32a thereof is put into a slot 31a made in the lock pin 31. When the shaft 32 is rotated by 180°, the lock pin 31 can be reciprocated by the distance corresponding to twice of the amount of eccentricity. Therefore, the attach pin 20 fitted into the pin hole 22 can be locked.

Next, with respect to the other attaching pin 21 to be fitted into the rear pin hole 23, an adjusting bolt 33 perpendicular to the pin hole 23 is mounted in the middle of the pin hole 23, and a lock bolt 34 is threaded from the direction perpendicular to said bolt 33 so as to correctly retain the adjusting bolt 33 in its adjusted position.

In this connection, the attaching pin 21 fitted into the pin hole 23 has its face in contact with the front end of the adjusting bolt 33 made in plane and chamfered, allowing a fine release slope. The adjusting bolt 33 is so constructed that with the adjusted position locked, the tool holder 10 can be removed or put back on the attaching pin 21.

An adjusting bolt 37 is provided also in a position opposite the adjusting bolt 33 to lock the attach pin 21 fitted into the pin hole 23. This adjusting bolt 37 is not, however, provided with any lock bolt.

In addition, a bolt 35 for adjusting the level of the tool holder 10 is provided in position close to the forward pin hole 22 in parallel to the pin hole 22. In the middle of the bolt 35, a bolt 36 is provided to lock the adjusted position of the bolt 35 firmly and correctly in a direction perpendicular to said bolt 35.

The foregoing description gives the construction of the tool holder 10 according to this invention. FIGS. 2 and 3 well illustrate how the tool holder 10 is attached to the cutting tool rest 7.

A first feature of the tool holder according to the invention as described resides in the fact that the tool holder is simply and firmly mounted on the cutting tool rest by merely fitting the pin holes into the attaching pins and pin-locking.

A further feature resides in that centering by a microscope type centering jig independent of the machine tool body can be traced with high accuracy. This second feature of the invention will now be described in detail.

Figure 8:
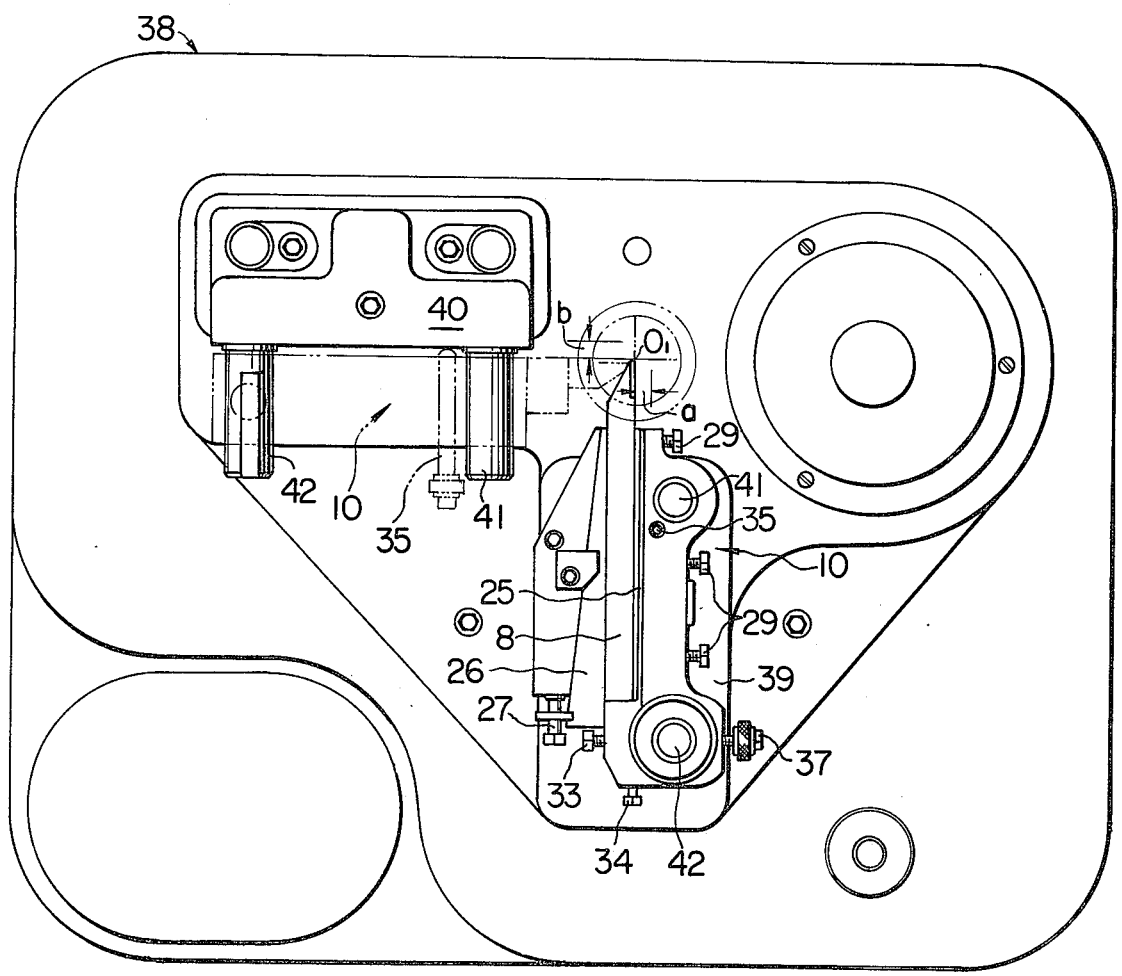
FIGS. 8 and 9 are a plan view and a front view, respectively, of a microscope type centering jig.
Figure 7:
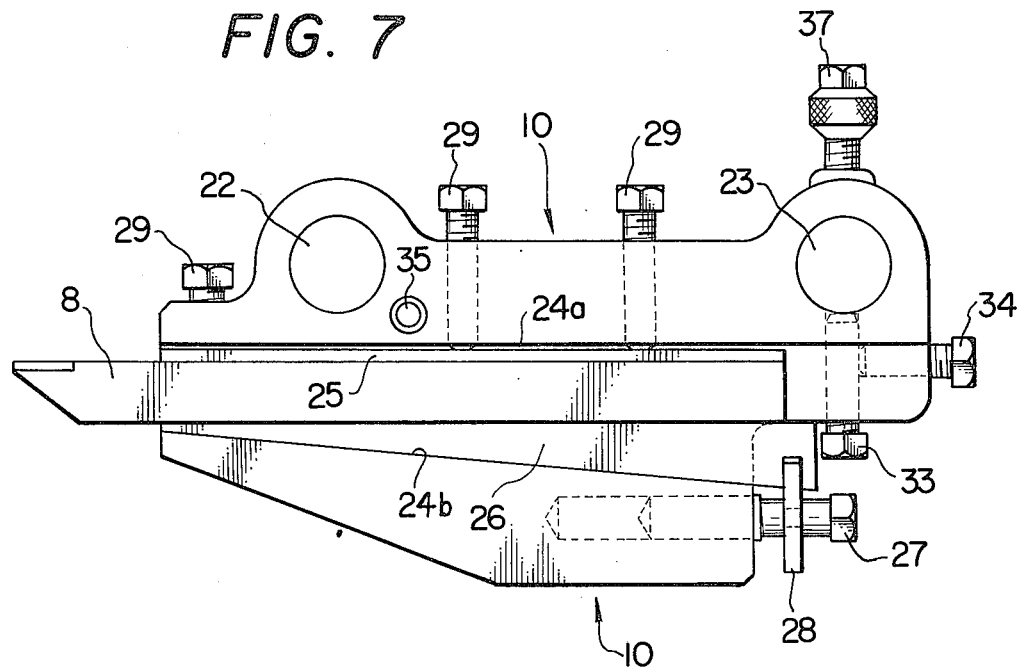
Figure 9:
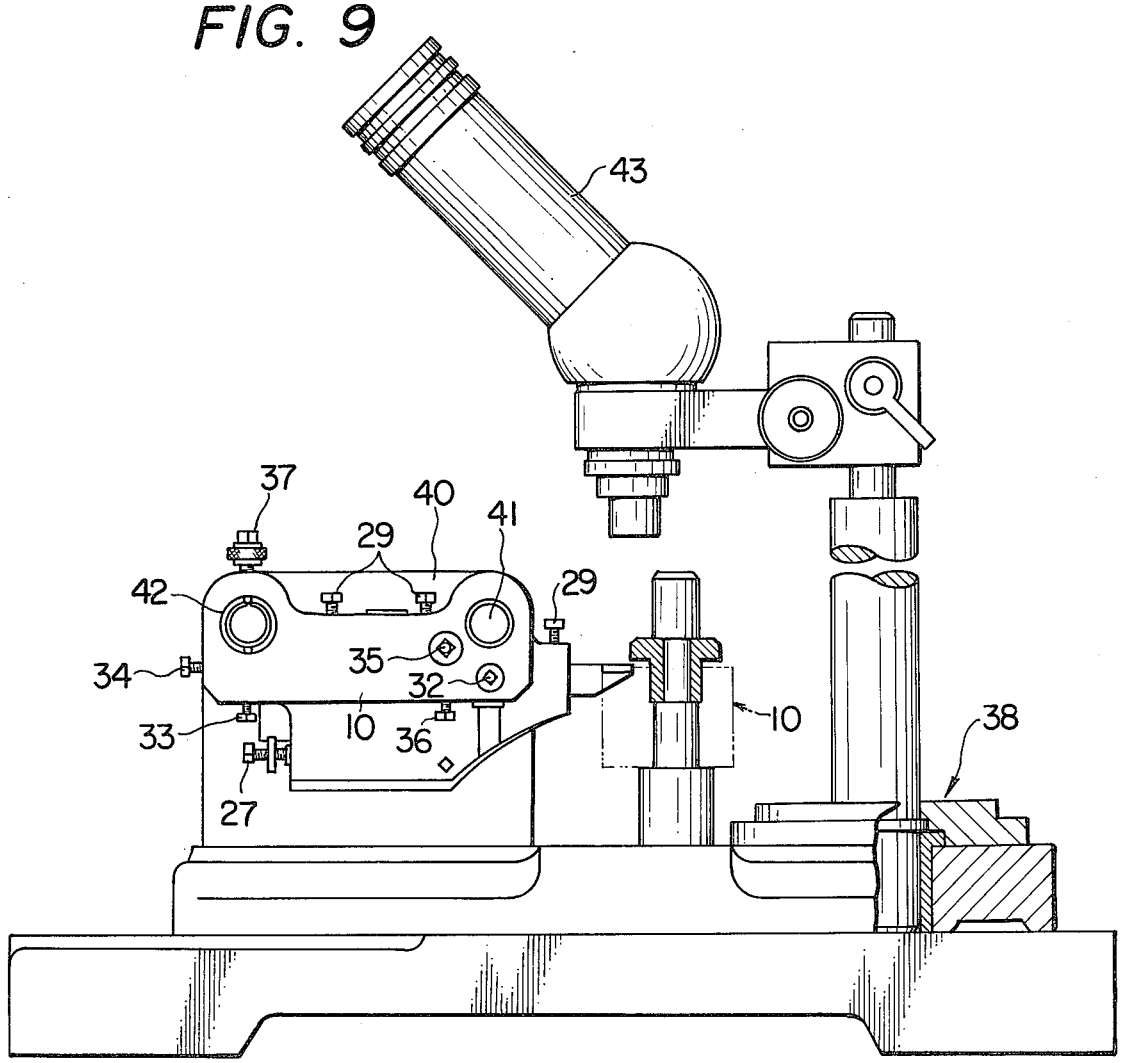

FIGS. 8 and 9 illustrate a microscope type centering jig and the mode of centering thereof. This microscope type centering jig 38 comprises tool holder receiving bases 39 and 40, which represent the relative position between the work in the machine tool body and the cutting tool rest, with the center $O_1$ of the work made as an original point, the base 39 for receiving the tool holder in horizontal, with the base 40 receiving in vertical.

Further, the two receiving bases 39 and 40 in the jig have two parallel set pins 41 and 42 exactly the same as the attaching pins 20 and 21 mounted on the cutting tool rest 7 in dimension, shape, and arrangement.

Therefore, in centering the cutting tool 8, first the tool holder 10 is set to the receiving base 39 and the front set pin 41 is firmly locked by the lock pin 31 through the operation of the cam shaft 32. Then, rear adjusting bolts 33 and 37 are operated to adjust parallelism relative to proper movement of the cutting tool 8, and when adjustment is determined, the adjusting bolt 33 is locked by means of the lock bolt 34.

Thereafter, the front end of the cutting tool 8 is set to the original point $O_1$ and adjusting bolts 29 are operated to adjust dimension $a$, and after adjustment is made, the adjusting bolt 27 is firmly threaded and the cutting tool 8 is secured by the wedge 26.

The foregoing adjustments are performed by viewing through a magnifying glass 43. Then, the cam shaft 32 is operated to untighten the front set pin 41 and to untighten only one adjusting bolt 37 which holds the rear set pin 42, and the tool holder 10 is disengaged from the receiving base 39 and set to the other receiving base 40.

In the receiving base 39, the level adjusting bolt 35 is operated to adjust dimension *b* with the tool holder 10 remained to be fitted in the set pins 41 and 42, and after the adjusting position has been determined, the holdler is again disengaged from the receiving base 40 and attached to the cutting tool rest 7 corresponding to the machine body.

Mounting onto the cutting tool rest 7 should be carefully and accurately performed in order to maintain the adjustment obtained in a manner as described. In actual operation, the cam shaft 32 is operated so that the front attaching pin 20 is firmly stopped by the lock pin 31 and the adjusting bolt 37 is operated so that the attaching pin 21 is firmly locked. This will result in centering by the jig correctly traced to the machine body.

As in the foregoing, in accordance with the present invention, the tool holder can simply and accurately be mounted on the cutting tool rest, centering of the cutting tools can easily be effected, providing an accurate tracing.

What is claimed is:

1. A tool holder adapted for mounting on a cutting tool rest comprising:
   a. a main body portion;
   b. first and second parallel attaching pins affixed to said tool rest a predetermined distance apart;
   c. first and second holes in said body portion spaced apart said predetermined distance and adapted to receive said attaching pins, said holes allowing a fit tolerance of high accuracy with respect to said attaching pins;
   d. means for locking said first and second attaching pins in said pin holes and wherein said means for locking said second attaching pin comprises a first adjusting bolt fitted into said second attaching pin and a second adjusting bolt fitted into said second hole by movement in a direction diametrically opposed to the direction of movement of said first adjusting bolt; and
   e. means for securing cutting tools to said tool holder including a channel in said main body portion, said channel having a first wall surface and a second wall surface which is inclined with respect to said first wall surface, wherein said first wall surface extends along the longitudinal axis of said channel and is parallel to a line connecting the centers of said first and second holes.

2. A tool holder as set forth in claim 1 further comprising means for locking said first adjusting bolt in the adjustd position.

3. A tool holder as set forth in claim 1 further comprising a leveling bolt for adjusting the level of said tool holder.

4. A tool holder as set forth in claim 3 further comprising means for locking said leveling bolt.

5. A tool holder as set forth in claim 1 further including a cutting tool positioned in said channel and having one end projecting beyond said channel, and wherein said means for securing said cutting tool further includes a wedge positioned against said second wall surface, said wedge having a first end which is more narrow than a second end, said first end of said wedge being forced against the end of said cutting tool which projects beyond the end of said channel.

* * * * *